Figure 1:
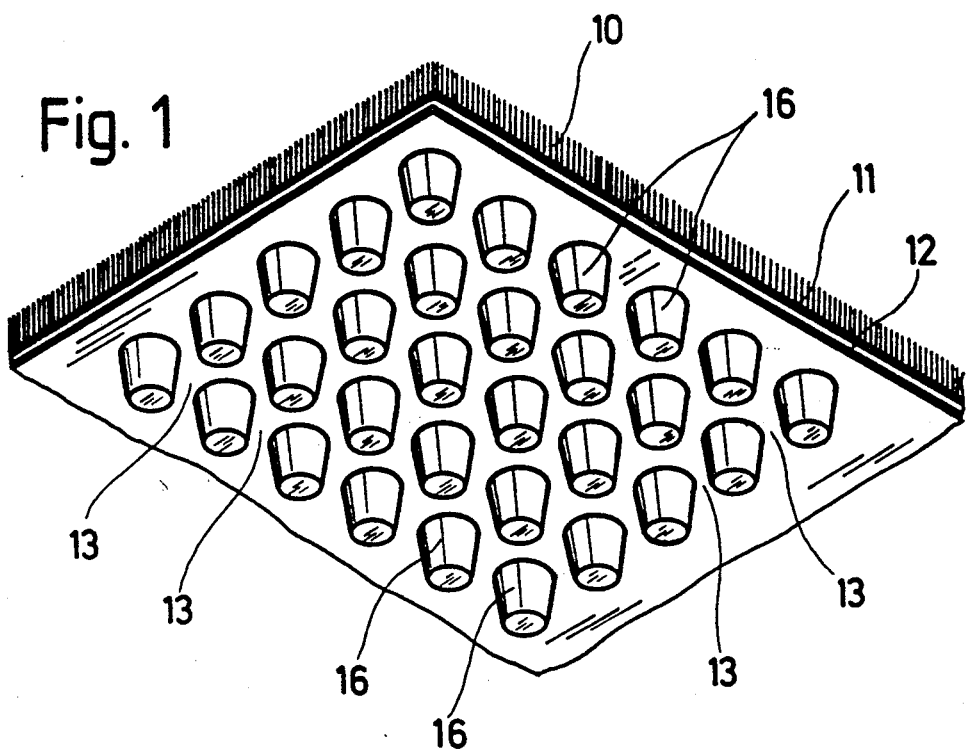

United States Patent [19]

Starp

[11] Patent Number: 5,082,712
[45] Date of Patent: Jan. 21, 1992

[54] FLOOR COVERING/WALL COVERING

[76] Inventor: Hubertus C. Starp, Falkenweg 37, D-7400 Tübingen 1, Fed. Rep. of Germany

[21] Appl. No.: 147,712

[22] Filed: Jan. 25, 1988

Related U.S. Application Data

[63] Continuation-in-part of Ser. No. 914,475, Oct. 2, 1986, abandoned.

[30] Foreign Application Priority Data

Oct. 5, 1985 [DE] Fed. Rep. of Germany ....... 3535632

[51] Int. Cl.⁵ .......................... B32B 3/26; B32B 5/22
[52] U.S. Cl. .......................... 428/95; 428/174; 428/175; 428/178; 428/180; 428/254; 428/260; 428/304.4
[58] Field of Search ................. 428/95, 175, 178, 180, 428/174, 254, 260, 304.4

[56] References Cited

U.S. PATENT DOCUMENTS 3,887,737 6/1975 Baxter .................................. 428/95
4,412,877 11/1983 Vosburgh ........................... 428/95

Primary Examiner—Jenna Davis
Attorney, Agent, or Firm—Dick and Harris

[57] ABSTRACT

A floor covering with a fiber pile which is anchored in a layer selected from the group consisting of a latex, polyvinyl chloride, and bitumen layer, and a substrate layer, includes a base plate. The base plate is provided with burls which project to one side in rows at a distance with attendant formation of cable channels. The base plate with the burls is constituted by a knitted or woven material which is coated with synthetic resin and hardened. Alternately the cable channels can be provided in a spacer of planar configuration which has burl-type projections on at least one planar side, and where the projections leave between them intermediate spaces which constitute the cable channels.

41 Claims, 11 Drawing Sheets

Fig. 4
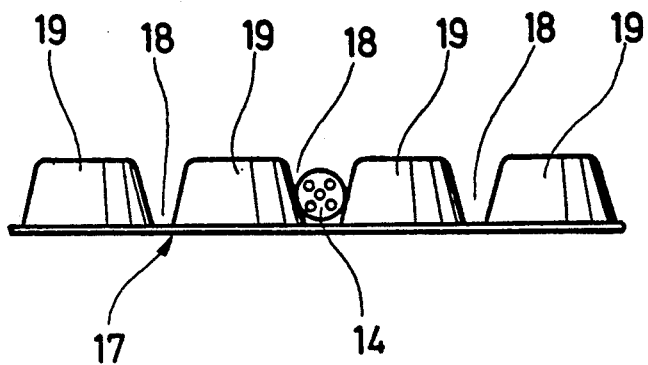
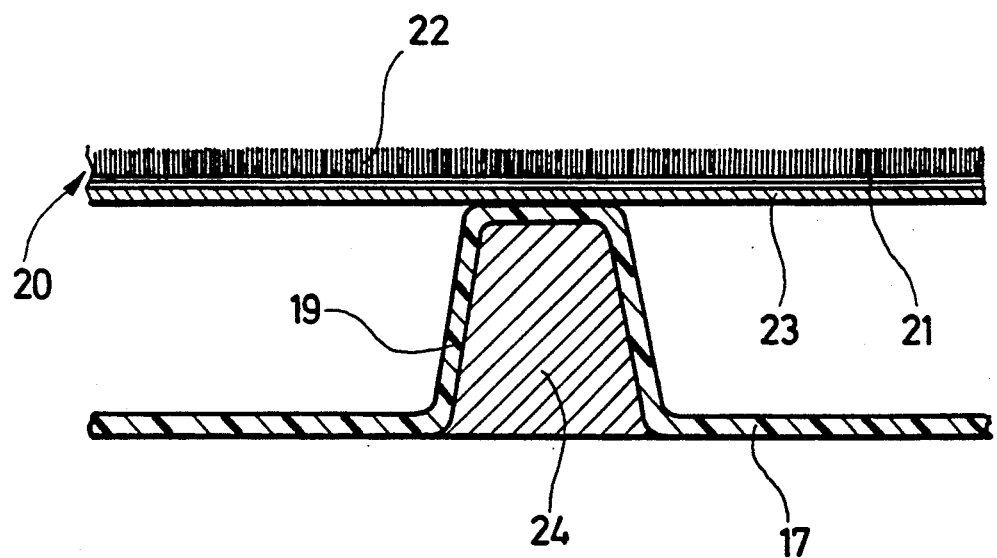
Fig. 5

Fig. 6
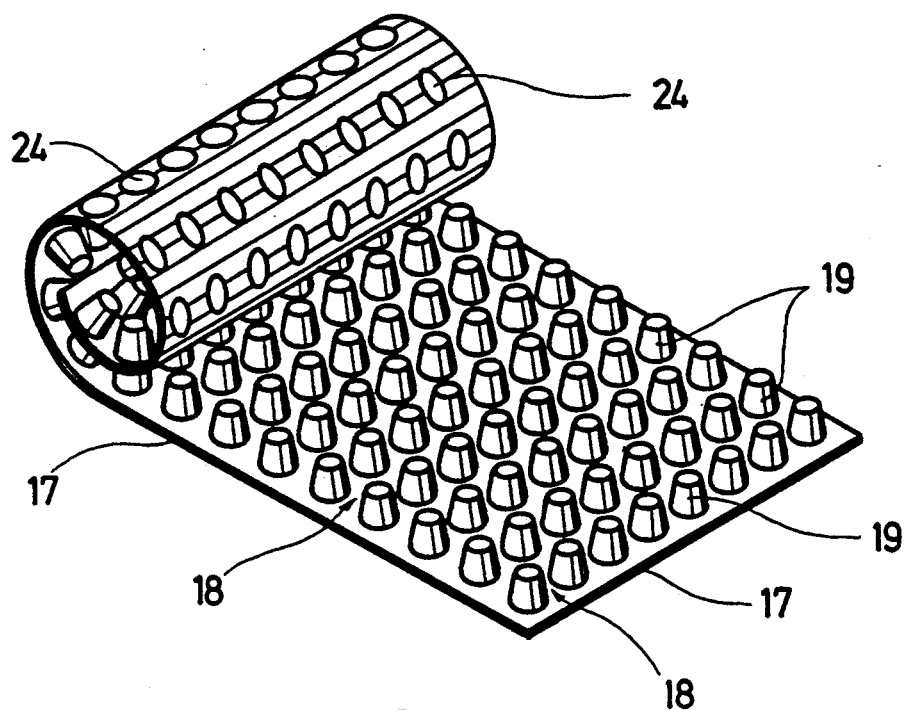
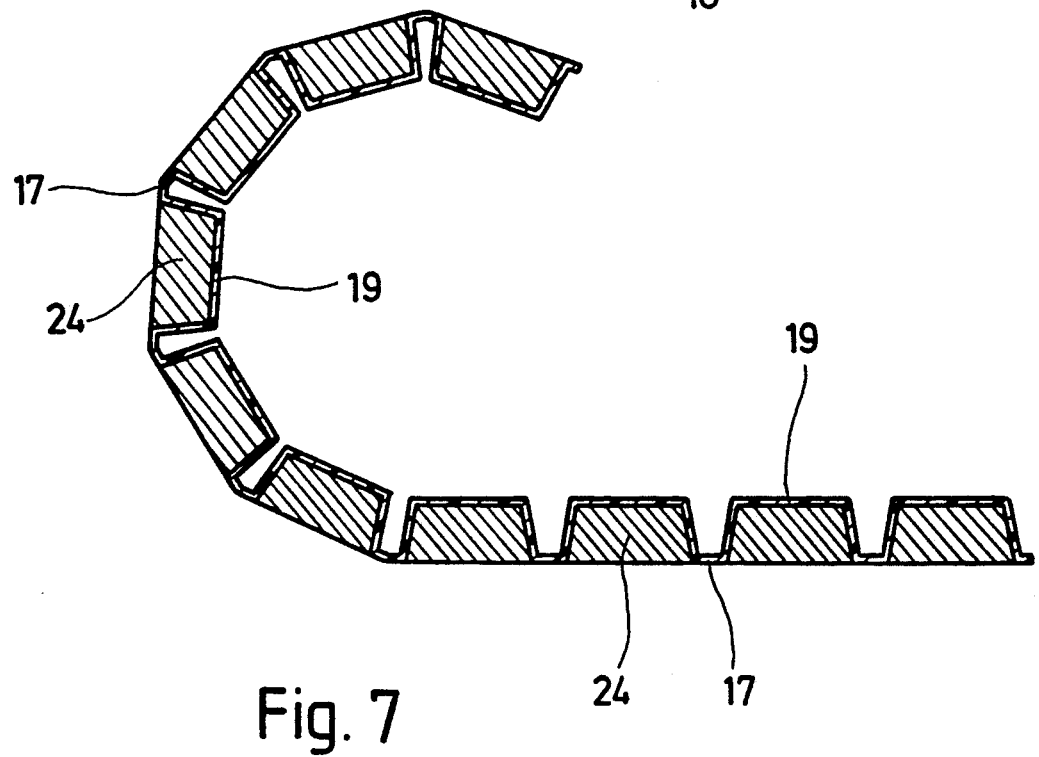
Fig. 7

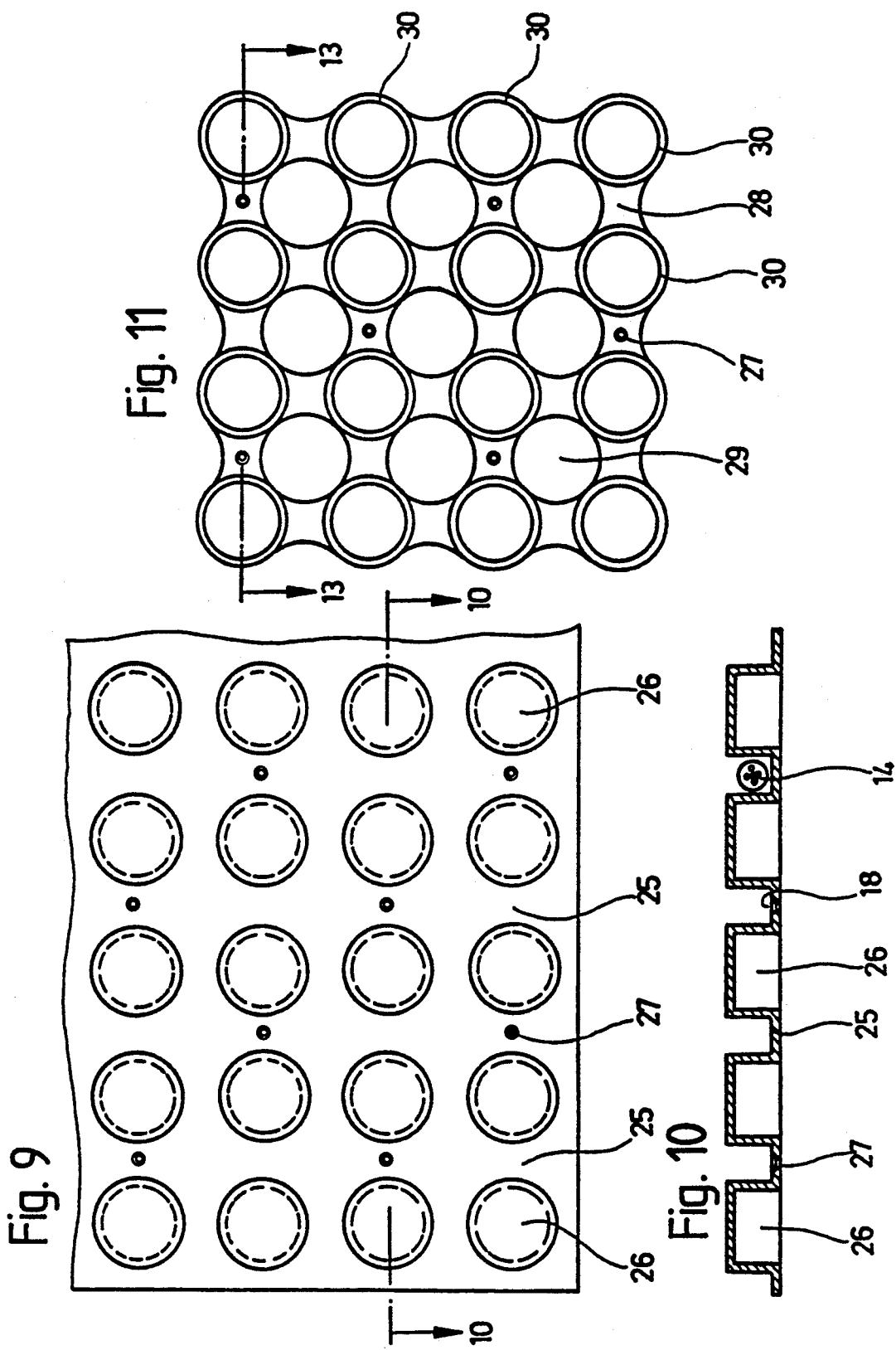

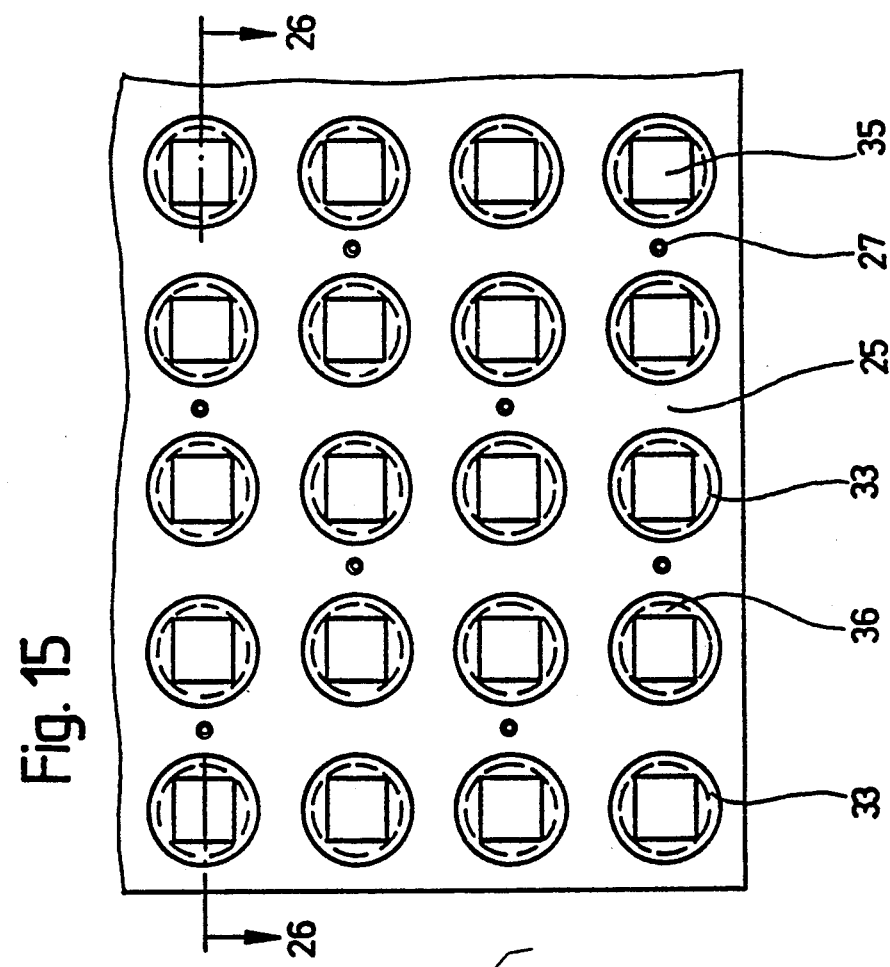
Fig. 15
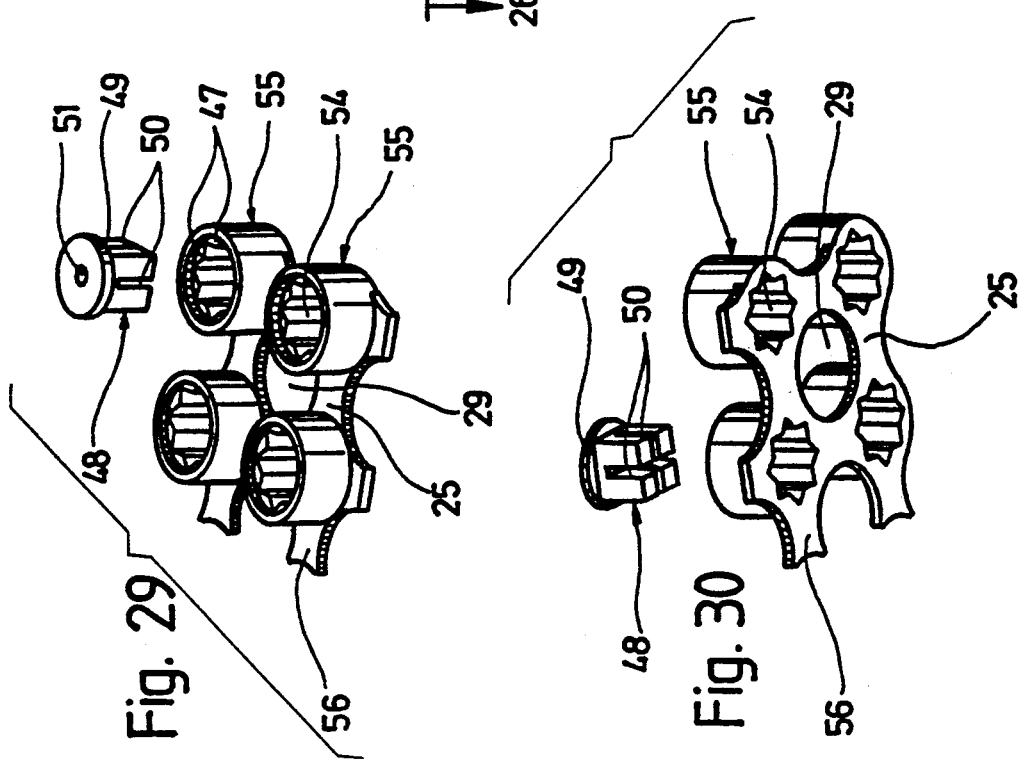
Fig. 29
Fig. 30

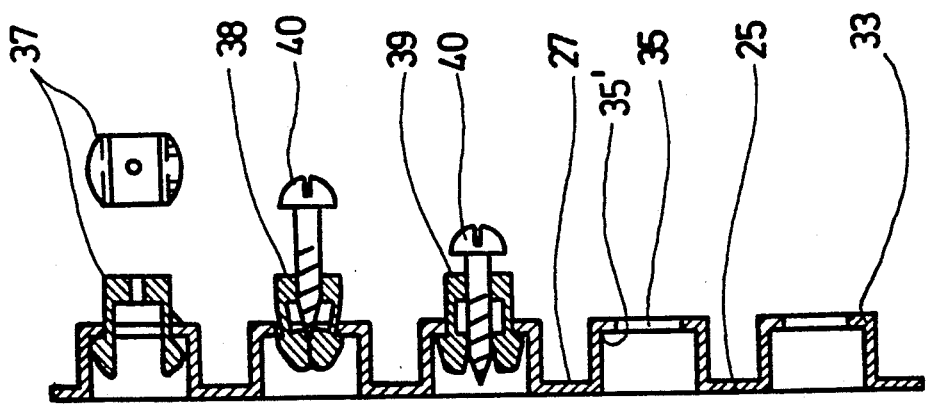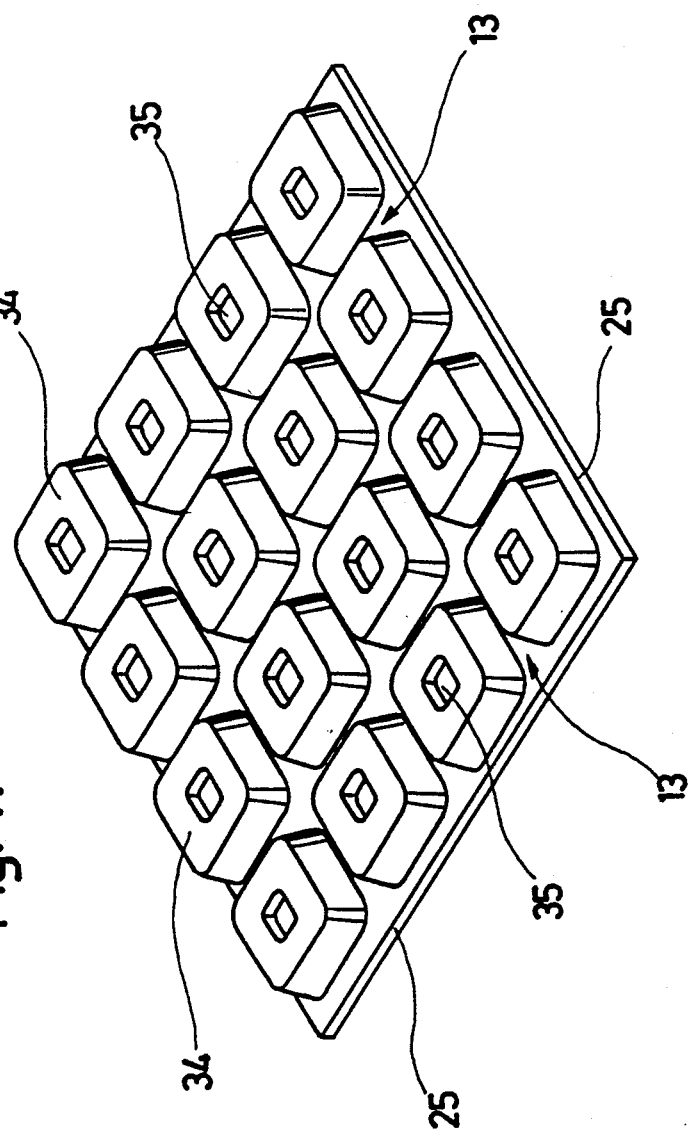

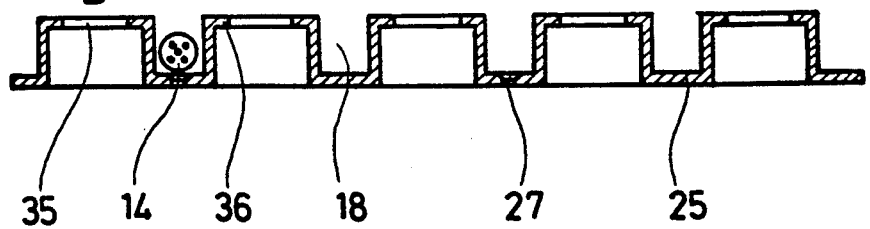
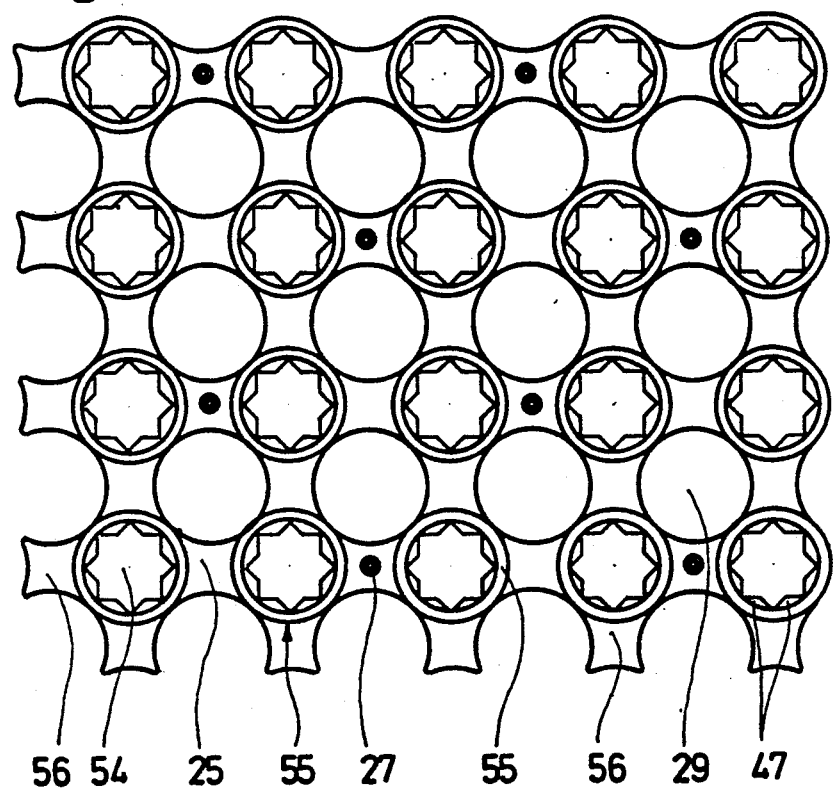
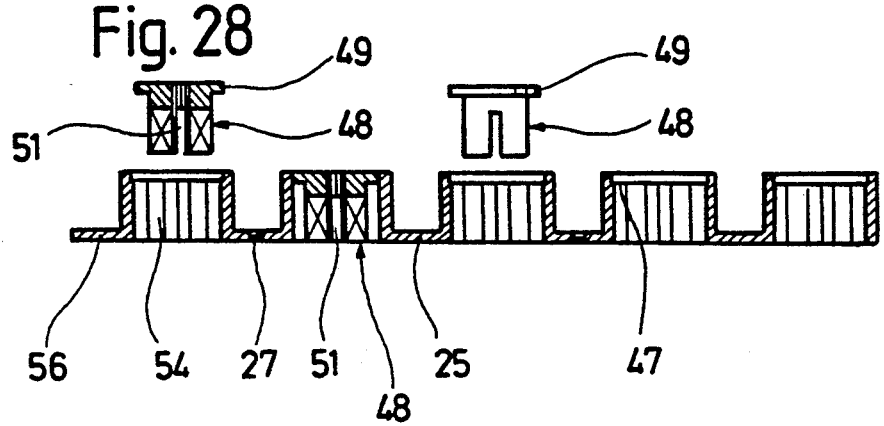

FLOOR COVERING/WALL COVERING

This is a continuation-in-part of Ser. No. 914,475, filed Oct. 2, 1986, now abandoned.

The invention relates to a floor covering/wall covering which can have the configuration of plate material as well as that of roll material.

The modern communications technology requires the installation of electrical and optical transmission cables in function rooms in order to interconnect the individual function devices with one another.

The installation of customary round cables runs into difficulties since these cables, on the one hand, cannot be installed on top of the floor covering for reasons of technical safety, and, on the other hand, when they are to be installed below the floor covering, special measures such as double bottoms, empty pipes or the like are necessary in order to avoid humps, bulges and other disadvantageous elevations caused in the floor covering by the cables lying thereunder. Among other things, these measures involve a great deal of expenditure and thus are costly. They must be included in the construction plans of new buildings and, as a rule, cannot be carried out subsequently in buildings once these have been constructed.

It is already known to avoid these disadvantages by the installation of flat cables. However, what is involved here are special constructions of cables which are coupled with high costs and which also require special plug connections which differ from the customary standard designs. Only specially qualified skilled persons are allowed to install flat cable systems. In many U.S. States and European countries, flat cables are not permitted by the authorities or for reasons of safety they are subject to strict limitations.

The object of the invention is to provide a floor covering which enables, by means of channel-forming layers, the reception of customary cables with simple installation work and high safety guarantee performance.

According to the invention, this object is achieved in a floor covering of the above-mentioned type in that there is provided a base plate with unilaterally projecting burls which by means of their geometrical configuration form (cable) channels. The base plate with burls is formed in one piece by the burls being thermoplastically pressed in the intended shape and arrangement out of a material which is knitted, woven, nonwoven or the like and which is impregnated with synthetic resin and hardened.

Such a base plate with burls is distinguished by a very low weight and a high weight-related strength.

In a preferred embodiment of the base plate with burls, the burls are filled with synthetic resin/polyester concrete in order to further increase the load carrying capacity of the base plate. The above-mentioned filling material has an extremely high weight-related strength which is many times greater than the static and dynamic load carrying capacity required in the floor of office buildings, hotels, convention centers and similar buildings.

Cables, light wave conductors and the like for telephone, data processing equipment, electric current or the like can be installed without any significant mounting expenditure in the channels formed by the height of the burls, their geometrical configuration and their spacing from one another. The floor covering according to the invention enables cables in rooms and buildings to be supplemented in any chosen way and altered any number of times without significant time or mounting expenditure.

In a preferred embodiment, the burls are thermoplastically stamped out (pressed out) of a knitted, woven or nonwoven web or the like which is impregnated with synthetic resin and hardened, by means of separate tools and molds. The burls may have a round, square or rectangular base area and are preferably of conical configuration, the angle of inclination of the side surfaces to the base area being between 60 degrees and 89 degrees. In this embodiment, the burls are of frusto-conical or frusto-pyramidal configuration.

In order to conduct electrostatic charges away, it is preferred to introduce into the knitted, woven, nonwoven material or the like, conductive fibers such as metal fibers or carbon fibers which in addition to their electric conductivity may also contribute to an increase in the strength of the base plate with burls.

These conductive fibers may be twisted around the fibers of the knitted or woven material.

In a further preferred embodiment, the conducting away of electrostatic charges can be achieved by adding to the synthetic resin/polyester concrete used for filling the burls, conductive substances such as graphite powder, aluminum powder or the like.

In another embodiment, the conductivity is achieved by a conductive metal such as aluminum or the like being vapor-deposited on the entire base plate with burls or by it being galvanically coated with a suitable conductive metal such as copper, nickel or the like.

The fiber-forming substance of the knitted or woven material or the fibrous material of the nonwoven material can preferably consist of polyester, polyamide, polyacryl nitrite or of other suitable synthetic fibers or of glass fibers.

Condensation resins such as phenolic resins or the like are to be preferably used for the synthetic resin for the impregnation of the knitted, woven or nonwoven material. When a resin proportion of up to 50% by weight with respect to the weight of the impregnated knitted, woven or nonwoven material is used, there is obtained after the hardening a base plate material which is still flexible. It is of a particular technical and economical advantage to be able to make the product available not only as plate material but also as web material as rolls, which aside from the improved handling during transportation and installation also offers greater safety. In this manner, the electrostatic voltages can be better channeled and kept away from the electronic office machines than with the tile-shape, since tile edges can exhibit a high transfer resistance.

The use of a planar structure of fibrous material for the base plate according to the invention is also advantageous with respect to the burls for increasing the compressive strength. A good mechanical bonding with the filling material occurs via the pores and intermediate spaces of the fibrous structure. The filling material consists preferably of polyconcrete which is a quartz powder cemented with polyester resin. The quartz powder proportion by weight may be between 30% and 70%.

In a further preferred embodiment, the above-described burls can be filled with a substantially rigid filling material, preferably synthetic plastic material concrete consisting, for instance, of a quartz powder cemented with synthetic resin (polyester resin) which penetrates into the mesh of the burls during the fluid (plastic) filling.

A filling material of this kind exhibits good adhesion in the filled burl and enhances its low inflammability.

In a further preferred embodiment, there is added to the synthetic plastic material concrete used as filling mass for the burls, in addition to synthetic resin (polyester resin) and quartz powder, a component of a conductive substance, for example, graphite powder or aluminum powder in order to improve the conducting away ability and the electrical resistance. The proportion of the conductive substance by weight may be between 5% and 25%.

Filled burls of this kind possess a high strength against mechanical loads such as, for instance, heavy file cabinets, castor chairs or the like.

In a further preferred embodiment, there can be secured to the underside of the (soft) substrate layer of a carpet tile, carpet web, PVC tile or PVC web or the like as floor covering, a hard base plate with a thickness of 1 mm to 6 mm, consisting of aluminum or another suitable metal, rigid PVC foam or another suitable rigid foam, or a hardboard multi-ply wood or paper or the like. The thus formed upper portion of the floor covering according to the invention is placed loosely on the base plate fixed (by adhesion or screws) with upwardly oriented burls on the floor. On the underside of the hard base plate there may protrude at a spacing of 30 to 50 cm grid elements which are positioned so as to frictionally engage the spaces between the burls of the base plate for mutual fixing. The shape of the grid elements results from the shape of the spaces between the burls of the base plate while the size of the individual grid elements is so selected that they contact at least six burls when engaging the base plate.

In a further preferred embodiment, instead of grid elements, the underside of the hard base plate is provided with a thin foamed material/foamed rubber layer or a layer of soft adhesive material into which the burls of the base plate can be easily pressed for fixing purposes.

In a further embodiment, a modified PP or a PP recycling material is used to improve the electric conductivity of the base plate with burls.

In a further embodiment with PP injection molding, the burls of the base plate have only a very slight conicity (only determinable by measurement) due to the manufacturing technique, with the result that the burls with a round base area appear cylindrical, while in an embodiment of the burls with a square base, the burls appear brick-shaped or cube-shaped. Such a burl shape results in an increase in the load carrying capacity in comparision with a conical shape, and, with the same working width of the channels formed by the burls, in smaller spacing between the burls at the upper burl edges. This further increases the load carrying capacity of the floor covering according to the invention.

In a further preferred embodiment, recesses are provided in the base plate between the burls in order to economize on weight, raw materials and material costs. The recesses may be of round, square or another suitable shape.

In a preferred embodiment with PP injection molding, the burls are open at the top in order to economize on weight, raw materials and material costs.

In a further preferred embodiment of the base plate with burls made of PP, which can preferably be used as wall covering, the burls have on the upper end side an opening which is smaller than the internal diameter of the burls, thereby forming an inwardly oriented edge. The openings may have a round, square or other suitable shape. Insertable (clampable) in the openings are elements on the outwardly protruding part of which there can be attached hooks, rings or the like for accommodation of tools, appliances, etc. in workshops, for attaching exhibition goods (on stands at trade fairs, in shops and exhibition rooms or the like). It is particularly advantageous that the (attachment) elements can be mounted individually and variably in accordance with the respective purpose without additional time and cost expenditure.

In a further preferred embodiment of the base plate with burls, screw holes are provided in the base plate to facilitate additional attachment by means of screws.

In a further embodiment with PP injection molding, the conical burls are of such configuration that the side walls increase towards the base plate in order to achieve greater load carrying capacity.

In a further embodiment for particularly high loads, as may be required in factory premises, workshops or the like, the base plate with burls may be pressed out (stamped out) of sheet steel or other suitable sheet metals in a cold-forming method or other suitable methods.

In a further preferred embodiment, the burls have a square opening with inwardly located walls forming a right angle of 90 degrees with the base plate. On the upper end side of the burls, the opening is of such configuration that an inwardly oriented shoulder is created. The opening is intended for reception of plug elements which are of such configuration that they can be pressed fully into the burls and terminate flush with the upper edge of the burls. The upper end plate of the plug elements then rests on the inwardly oriented shoulder and is firmly supported there. The plug elements are provided with a cross slot the effect of which is to firmly press them against the inside wall of the burls. They are additionally provided with a screw hole. When holding devices or the like, described in general above, are mounted on the plug elements by means of a screw, the four legs formed by the cross slot are spread apart and additionally press the plug element firmly inside the burls.

In a preferred embodiment of the base plate with burls, the opening described, in principle, above has an octagonal shape which on account of the smaller contact surfaces with the plug element, facilitates insertion and removal of these elements. The octagonal shape of the openings simultaneously reduces raw material expenditure and material costs in comparison with the previously described square openings. At the same time, the base plate is of such configuration that it protrudes at two sides at right angles to each other in such a way that it simultaneously serves as spacer in relation to the neighboring plate when the plates are laid on walls or on floors. The outer termination of the protruding parts is of concave arched configuration in the radius of the burls and receives the burls of the neighboring plate in these arches, which, in addition to correct spacing of the burls from one another, simultaneously ensures directional orientation during the laying procedure.

In a special embodiment, the upper end plate of the plug elements is provided with a double-sided adhesive tape in order to fix floor covering such as carpet tiles, PVC tiles or the like resting thereon or if the burled plate is used as wall covering, in order to attach wall linings or the like. The floor covering/wall covering according to the invention is distinguished by a high treading noise/room noise and heat damping.

Further features of the invention are apparent from the dependent claims.

The scope of protection extends not only to the claimed individual features but also to their combination.

Figure 2:
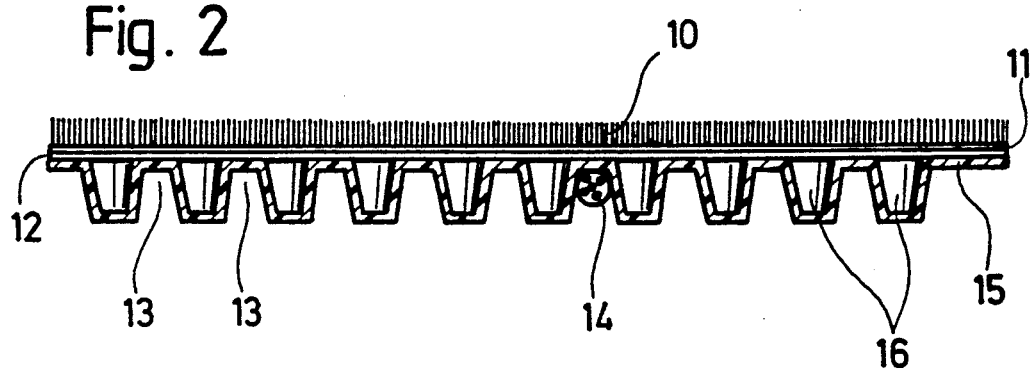
Figure 3:
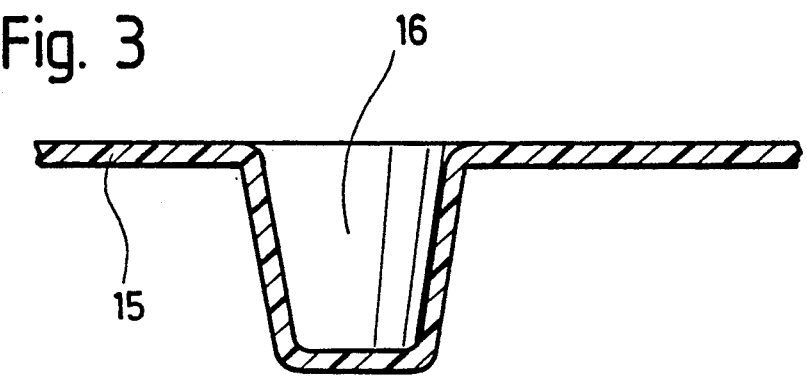
Figure 8:
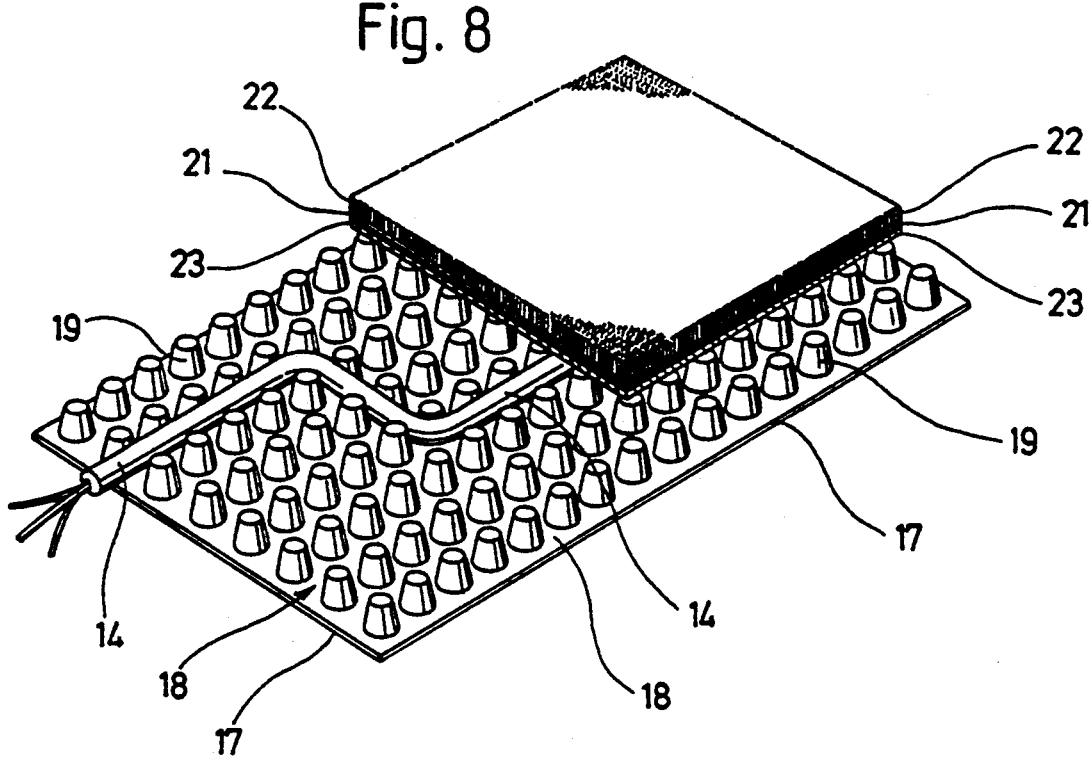
Figure 22:
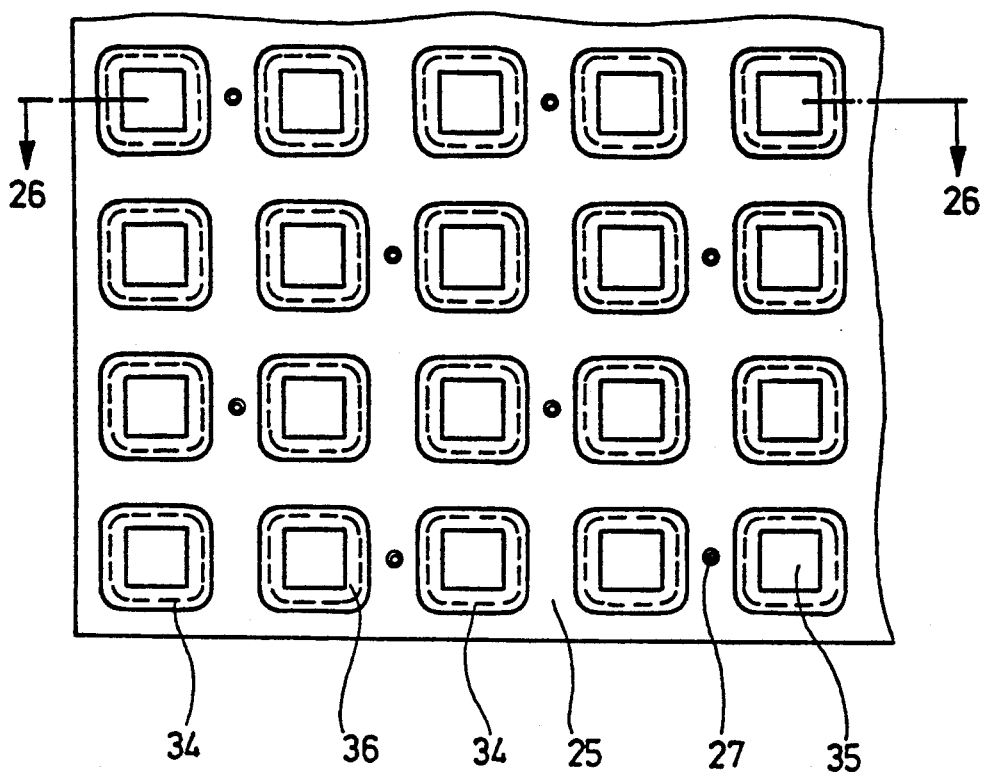
Figure 12:
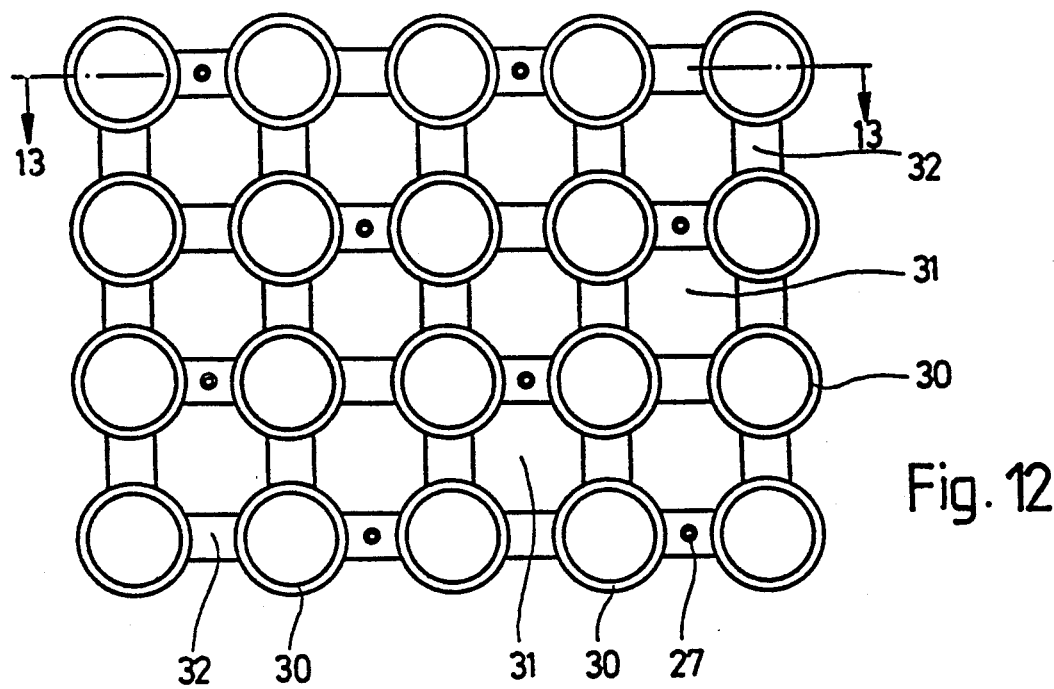
Figure 13:
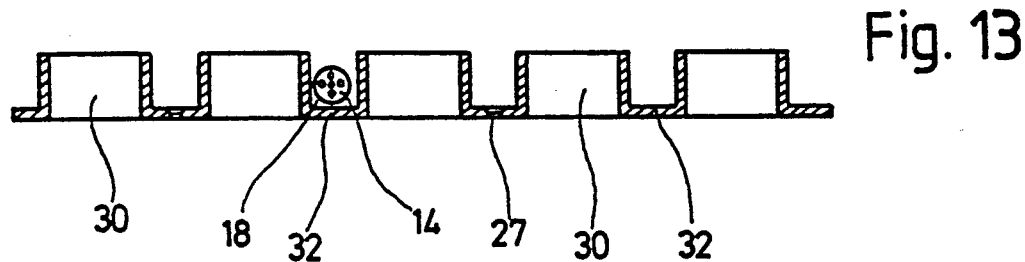
Figure 14:
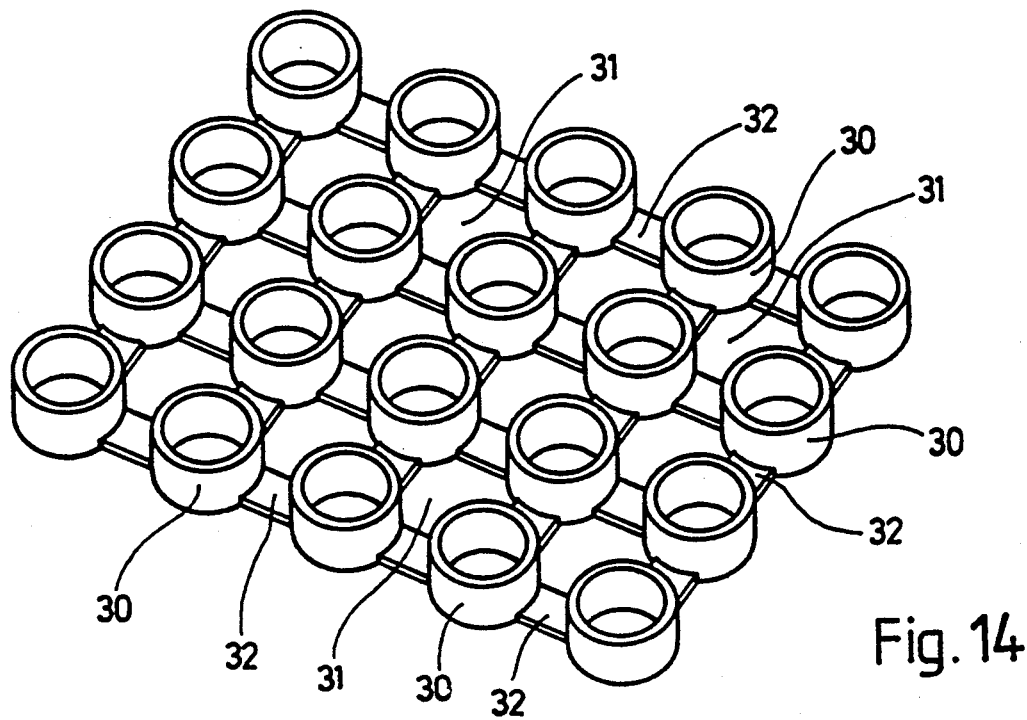
Figure 18:
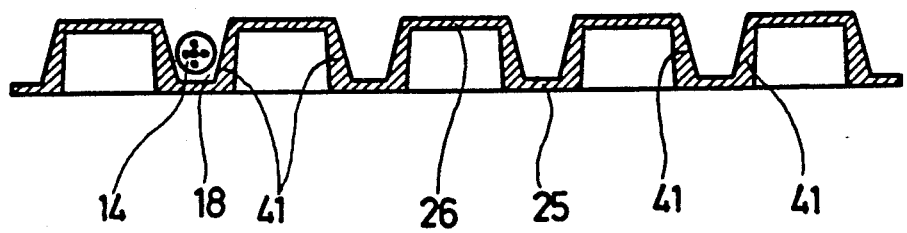
Figure 19:
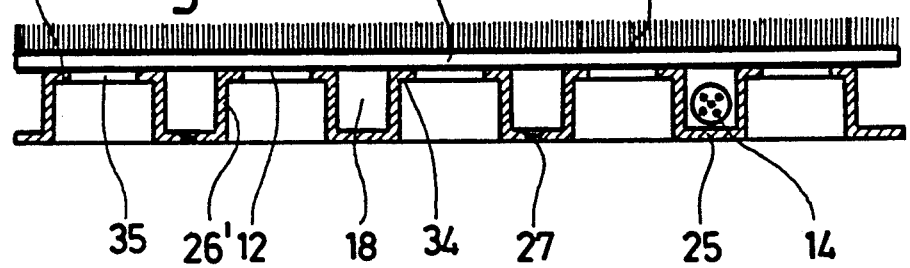
Figure 20:
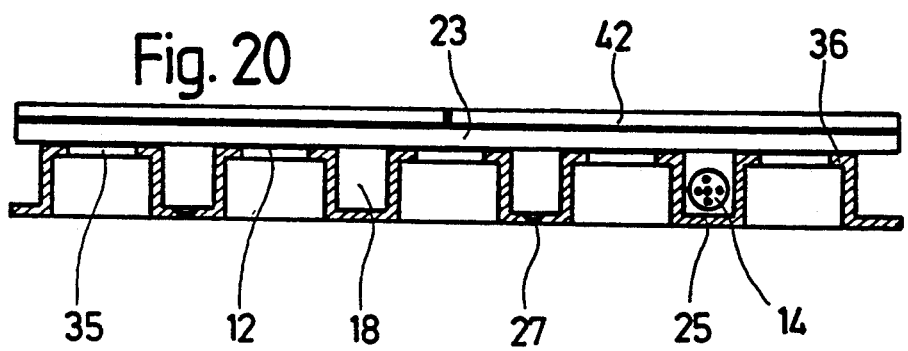
Figure 21:
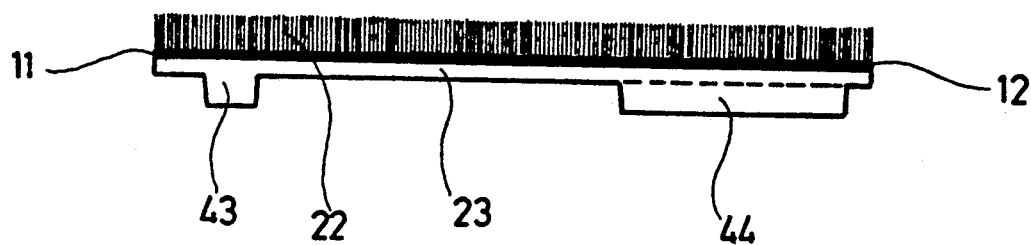
Figure 23:
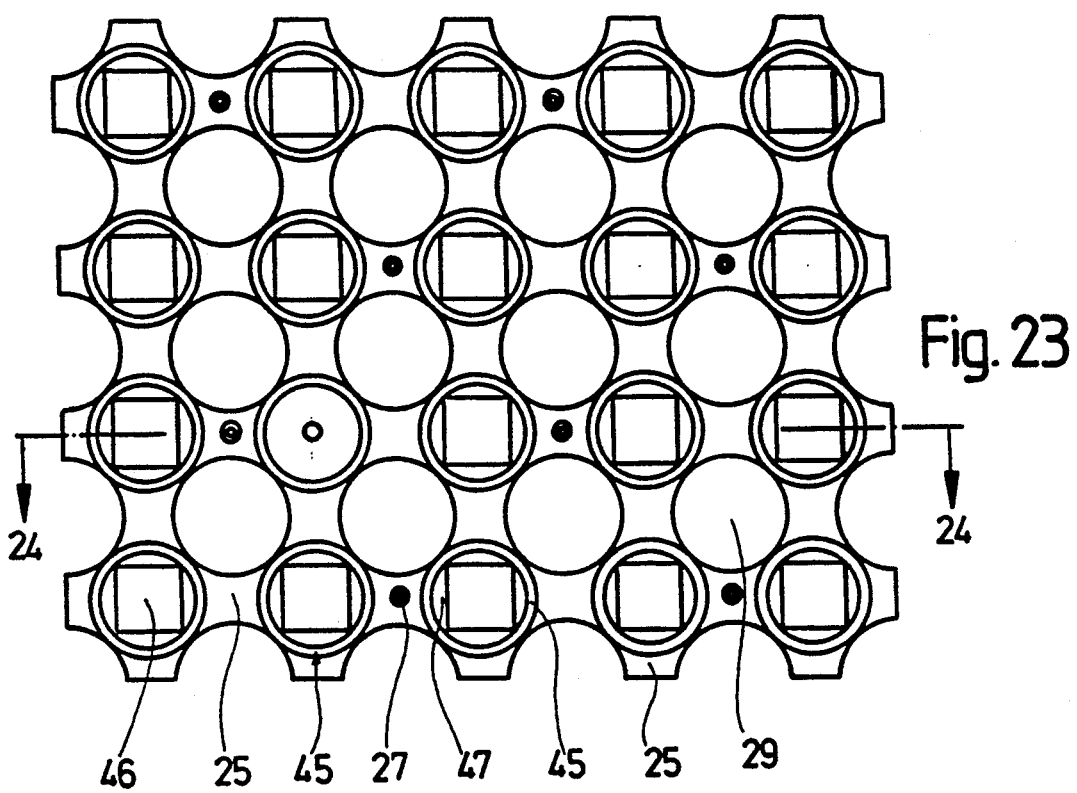
Figure 24:
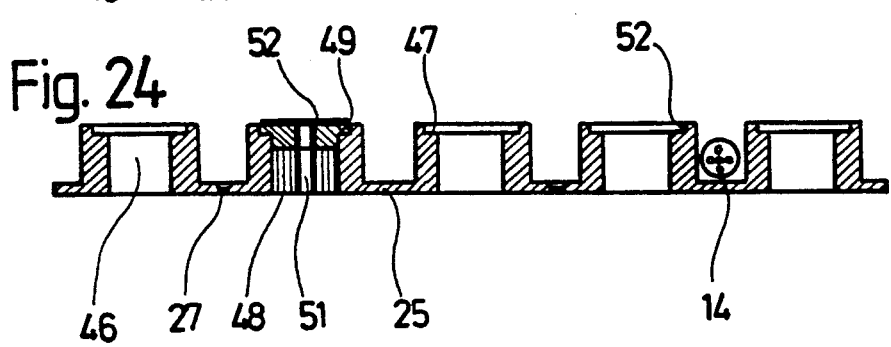
Figure 25:
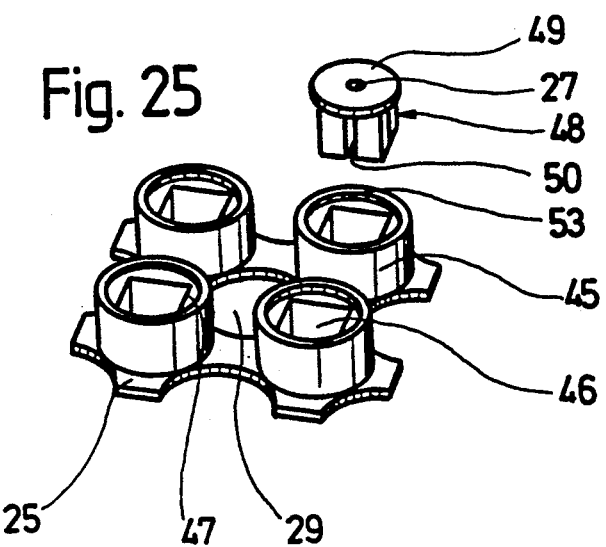

Embodiments of the invention are illustrated in the drawings which show:

FIG. 1 a perspective view of a floor covering with an upper pile in a latex layer and a substrate layer with a base layer (base plate) with projecting burls affixed underneath;

FIG. 2 a cross-section through the same floor covering (with a cable installed in a channel);

FIG. 3 a cross-section through a burl in an enlarged illustration;

FIG. 4 a side view of a base plate with upwardly oriented burls (with a cable installed in a channel);

FIG. 5 a section through another embodiment with a lower base plate with a burl that is filled with synthetic resin concrete and a floor covering situated above the same including a hard intermediate plate, latex layer and upper pile;

FIG. 6 is a perspective view of a base plate with upwardly oriented burls filled with synthetic resin concrete, in which rollability is demonstrated at one side;

FIG. 7 a cross-section through a base plate with upwardly oriented burls filled with synthetic resin concrete, in which rollability is demonstrated at one side;

FIG. 8 a perspective view of a base plate with upwardly oriented burls with a cable installed in the channels formed by the burls in such a way that the alterable directional orientation is shown, partly covered with a floor covering with a hard intermediate plate, latex layer and upper pile;

FIG. 9 a base plate with burls closed at the top and holes for screws with countersunk head (screw holes) for additional attachment of the base plate to the floor or the wall;

FIG. 10 a cross-section through the same base plate with burls (in accordance with FIG. 9);

FIG. 11 a base plate with upwardly open burls and screw holes and with round recesses in the base plate between the burls;

FIG. 12 a base plate with upwardly open burls and screw holes and with recesses in the base plate between the burls, in a type of embodiment in which the burls are joined together by the base plate in a grating-type manner;

FIG. 13 a cross-section through the burled plate with upwardly open burls in accordance with FIGS. 11 and 12;

FIG. 14 a perspective view of a base plate in accordance with FIG. 12;

FIG. 15 a base plate with upwardly oriented burls having square openings at the top which are smaller than the internal diameter of the burls, thereby forming inwardly oriented edges;

FIG. 16 a cross-section through a base plate with burls with square openings, in vertical arrangement as wall covering; inserted (clamped) in some of the openings forming an inwardly oriented edge are (plug) elements;

FIG. 17 a perspective view of a base plate with frusto-pyramidal burls with rounded-off side edges and square openings forming inwardly oriented edges;

FIG. 18 a cross-section through a base plate with conical burls whose side walls increase conically towards the base plate, with a cable installed in a channel;

FIG. 19 a cross-section through a base plate with upwardly oriented burls on which their lies as upper part of the floor covering a carpet tile to whose (soft) substrate layer there is attached a hard base plate whose underside is provided with a foamed material layer; a cable is installed in a channel formed by the burls;

FIG. 20 a cross-section in accordance with FIG. 19, but with the upper part of the floor covering formed by (soft) PVC tiles instead of a carpet tile;

FIG. 21 a cross-section through the floor covering in accordance with FIG. 19 whose hard base plate is, however, not provided with a foamed material layer but with protruding grid elements;

FIG. 22 a base plate with upwardly oriented square burls which have a square opening at the top which is smaller than the internal diameter of the burls, thereby forming inwardly oriented edges;

FIG. 23 a view of a base plate with round burls which have a square opening which is shaped so as to form an inwardly located shoulder; inserted in one burl is a plug element whose upper end plate terminates flush with the upper end side of the burl;

FIG. 24 a cross-section through a base plate with burls in accordance with FIG. 23 with a cable installed in a channel;

FIG. 25 a perspective view of the base plate with burls in accordance with FIG. 23 in an exploded illustration with an associated plug element with end plate, cross slot and screw hole;

FIG. 26 a cross-section through a base plate with burls in accordance with FIG. 22 with a cable installed in a channel;

FIG. 27 a view of a base plate with burls which have octagonal openings for reception of plug elements;

FIG. 28 a cross-section through the base plate in accordance with FIG. 27 in an exploded illustration with an associated plug element in perspective and cross-sectional views;

FIGS. 29 & 30 perspective views of a section of the base plate in accordance with FIG. 27 from different viewing angles.

A floor covering in the form or a roll or a tile carries at its upper side a fibrous pile 10 which is anchored in a latex layer 11 or the like serving as fixation layer Underneath this latex layer 11, there is glued a soft elastic layer such as a foamed rubber layer 12 or the like (FIG. 1).

For the formation of channels 13, into which cables 14 or the like that are installed on the floor are pressed, a relatively harder plate 15 with downwardly projecting burls 16 which are pressed out of the plate 15 and are arranged in rows extends in accordance with the invention underneath the foamed rubber layer 12.

This plate 15 which is provided with the pressed out burls 16 that are arranged in mutually perpendicular rows consists of a woven or knitted material consisting of synthetic plastic material threads or of a nonwoven material consisting of synthetic plastic material fibers which are soaked with or hardened by a synthetic plastic material (synthetic resin) and form a light-weight, but statically highly loadable (pressure-resistant) covering.

The burls 16 are preferably of generally frusto-conical shape and neighboring burls 16 of identical design enable by a sort of funnel shape the introduction (pressing-in) of the installed cables 14 into the channels formed by the burls 16.

The plate 15 with the burls 16 formed thereon is obtained, for instance, in that a knitted material made of chemical fibers (threads) or natural fibers and having a mesh width of, for example, 1 mm, is produced in webs on the customary knitting or raschel warp knitting machines. These webs are then soaked with a liquid synthetic resin and subsequently formed with the burls 16 in a precondensed state by means of a heated tool and subsequently hardened.

Herein, it is of advantage to choose a fiber material and a soaking material which have low inflammability.

Herein, it can be in the framework of the invention to also incorporate, in addition to the synthetic plastic material fibers, thin current conducting carbon fibers, metallic fibers or the like, which have the objective to conduct electrostatic charges away.

This so hardened plate 15 with the downwardly projecting burls 16 is then glued underneath the foamed material layer 12.

In the above-described embodiment, the cables or the like are installed on the floor first and then the tiles or rolls of the floor covering are laid from above in such a manner that the cables 14 or the like are pressed into the channels 13 which are formed between the burls 16 and the floor covering, despite the presence of the installed cables 14, presents an even surface for walking etc.

In the modified embodiment which is illustrated in FIG. 4, a base plate 15 with burls 19, as basically described above, is first laid either immediately or with an underlying base plate 17 onto the floor, and then the cables 14 or the like are pressed into the upwardly open channels 18 between the upwardly projecting burls 19. On this base plate 15 with the burls 19, there is then loosely laid a fiber pile tile (carpet tile) 20 which is formed in a known manner of the fiber pile 22 which is anchored in the latex layer 21 and in which a hard base layer 23 is affixed under the latex layer 21 to act as an intermediate plate in a load-distributing manner on the burls 19. This base layer 23 may be constituted, for example, by a steel plate which can be provided with an aluminum plating layer having a thickness of, for instance, 1 mm to serve as corrosion protection.

It may be preferred to coat the lower side of the rigid base layer 23 (intermediate plate) which lies on the upper end surface of the burls 19 with a contact adhesive so that this rigid, load-distributing base layer 23 with the fiber pile 20 situated on top of it can be removed at any time, and thus the channels 18 can be opened in order to control or replace the cables 14 or install additional cables. FIG. 8 shows a perspective view of the embodiment described here in the mode of function according to the invention.

The above-described base plate 15, 17 with burls 16, 19 may be loaded with a weight of more than 7500 kgf/m² even if the burls 16, 19 are not filled with a synthetic resin concrete or another substantially rigid mass. With this high carrying capacity, the floor covering already fulfills all requirements for use in rooms such as offices, etc. which are often frequented, and it is adapted to stresses from chair castors, etc. without the floor covering becoming compressed or deformed.

In a further modified embodiment according to FIG. 5, the burls 19 which are shown in an enlarged representation, are filled with a substantially rigid mass 24 such as synthetic resin concrete, so that the burls 19 exhibit a high stability. As illustrated in FIGS. 6 and 7, this filling (mass) 24, however, does not adversely affect the rolling of such webs 15, 17 made of the above-described knitted, woven or nonwoven material with the synthetic plastic material impregnation. This filling 24 penetrates in an advantageous manner into the mesh of the burls 16, 19. The pressure resistance of the base plate 17 with the burls 19 in the shape of a conical frustum of 10 mm having a height and a mean diameter of approximately 10 mm with a polyconcrete filling amounts to about 1600 N/cm².

As a result of the penetration of the filling mass 24 into the meshes of each burl 19, there is obtained a good adhesion of the mass 24, which also makes the burls 19 even more difficult to inflame and thus offers an increased fire safety.

Besides the woven materials according to the invention, knitted materials also exhibit a high extensibility during the forming of the burls 16, 19 from a plane web.

The burls which are filled with synthetic resin increase the weight of the floor covering to 4000 to 6000 g/m².

In a further embodiment illustrated in FIGS. 9 and 10, the base plate 25 with burls or projections 26 protruding at one side is manufactured as an integral burled plate in an injection molding process. An injection moldable synthetic plastic material, preferably polypropylene (PP) which is also available in sufficient quantities as recycling material is used as raw material. In constrast with other industrial products, a recycling material is well-suited for the burled plate.

Herein, it is of advantage to choose a PP raw material type which has low inflammability.

It is also advantageous to achieve the electrical conductivity of the burled plate by appropriate raw material modification, such as use (addition) of special types of soot in order to conduct away static charges and improve the surface and volume resistances. The proportion by weight of the conductive substance may amount to between 5% and 25%.

The base plate 25 is preferably provided with screw holes 27 to enable it to be secured additionally or instead of the customary attachment to the floor or wall surfaces (without additional preparation work in the form of subsequent drilling of screw holes).

Aside from that, identical parts bear the same reference numerals as in the preceding Figures.

FIG. 11 shows a modified embodiment in which a base plate 28 exhibits round recesses 29 between the open burls 30.

In FIG. 12, a slightly modified embodiment of a base plate is shown, in which the burls 30 are formed by hollow cylinders which are interconnected in grating-type configuration by radial bridges 32'. The effect of the recesses 31 is that the base plate 32 is more flexible (more easily bended) than the above-described, continuous base plate 25 and can thus adapt better to the bearing surface if there are small uneven areas in the floor or the wall surface.

In the embodiment shown in FIGS. 11 and 12, the burls 30 are open at the upper end side. This embodiment of the burls 30 results in no significant change in the load-carrying capacity, but reduces the weight of the burled plate.

The saving in weight achieved in the embodiments according to FIGS. 11 and 12 by the recesses 29, 31 and by the burls 30 open at the upper end side amounts to approximately 20% to 25% and is economically advantageous on account of the resulting saving in raw materials and costs. The lower weight is also advantageous with respect to transportation and easier handling during assembly.

FIG. 13 shows as a supplement a cross-sectional view of the embodiments according to FIGS. 11 and 12 and demonstrates installation of a cable 14 in a channel, while FIG. 14 shows the above-described embodiment according to FIG. 12 in a perspective view.

FIG. 15 shows a base plate 25 with round burls 33 which have square openings 35 whose clearance is smaller than the inside diameter of the burls 33. This results in formation of an inside annular shoulder 36 (vide also FIG. 26).

A modification of this is shown in FIG. 17 with the difference that herein the square burls 34 of the base plate 25 are of frusto-pyramidal shape with rounded-off lateral areas, the openings 35 again being of square shape and having an inside annular shoulder. The openings 25 serve to receive plug elements 37 as illustrated in FIG. 16. Cable channels 13 are located between the burls 34. As shown in FIG. 16, the burled plate 25 may also serve in vertical arrangement as support for a wall covering. The illustrated burls 33 have in their front end wall a rectangular opening 35 in which there are inserted a plug element 37 which spreads open radially and a clamping element 39 which has not yet been secured by screw pressure. These serve to receive a screw 40 which simultaneously serves to mount rings, hooks, containers or the like. The base plate 25 may also be alternatively provided as a spacer which can be mounted on a wall surface and to whose burls 33, 34 a wall covering can be attached.

In accordance with the variant illustrated in FIG. 18, the burls 26 are closed at the top and have burl walls 41 which increase conically downwardly in order to increase the carrying capacity.

A further modified embodiment is shown in FIG. 22. Provided in the above-described arrangement on the base plate 25 are burls 34 which have at their upper end side square openings 35 which are smaller than the clear width of the burls 34 and thus form inwardly oriented edges 36 at the upper end sides of the burls 34. When this burled mat is used as wall covering, the openings 35 in the burls 34 serve to receive plug elements and clamping elements 37, 38 on which rings, hooks, magnetic plates, containers, attachment elements or the like are held to receive or accommodate tools, appliances, small parts or the like.

FIG. 16 shows a burled plate according to the invention in vertical arrangement as wall covering. Inserted in the openings 35 of the burls 33 are a plug element 37, a clamping element 38 which has not yet been secured by screw pressure and an element 39 which is secured by screw pressure. The screw 40 generating the clamping pressure simultaneously serves to mount the above-described rings, hooks, containers or the like.

FIG. 19 shows a cross-section through a burled plate illustrated in plan view in FIG. 22, in which a wall or floor covering consisting of a fiber pile 10, a load distributing base plate 23 and a soft elastic layer 12 rests on the burls 26'. The burled plate has screw holes 27 for attachment to the floor, the cables 14 being installed in a chosen manner in the channels formed by the burls.

In accordance with FIG. 20, in a similar illustration, a soft tile 42 consisting, for example, of PVC is placed on top instead of the fiber pile 10. Alternatively, the floor covering may also consist of ceramic tiles, wooden parquet or other suitable conventional materials.

FIG. 21 shows in cross-section a load-distributing base plate 23 which is provided on its side facing the burled plate with protruding grid elements for engagement in the intermediate spaces between the burls. These grid elements 43, 44 of the base plate 23 may be positioned at such spacing that they contact at least six burls as they engage the burled plate.

FIG. 23 shows a plan view and FIG. 24 a cross-sectional view of a further burled plate 25 which is used as both floor plate and wall plate. The burls 45 are of conical shape with an angle of inclination of the side surfaces to the base plate 25 which may be between 60 degrees and 89 degrees. The square opening 46 at the end side of the burls 45 forms an inside annular shoulder 47 of 1 to 2 mm width and 1 to 2 mm depth. The inside surfaces of the openings 46 are arranged at an angle of 90 degrees to the base plate 25. The openings 46 serve to receive plug elements 48 which can be pressed completely into the burls so that the end plate 49 of the plug element 48 rests on the inside shoulder and terminates flush with the upper end side of the burls 45.

The plug elements 48 have in their lower part a cross slot 50 (FIG. 25) which fixes the plug elements 48 with slight pressure in the burls 45. The plug elements are additionally provided with a screw hole 27 which (as described above) serves to mount rings, hooks, containers or the like. The thus designed plug element is also advantageous for attachment of cover sockets or rosettes, plug sockets or the like at points at which the cables installed underneath the floor covering are to end. The plug elements enable cover sockets, plug sockets or the like to be screwed tight without additional assembly expenditure such as drilling, doweling or the like.

In a further embodiment, the end plate 49 of the plug element 48 is provided with a double adhesive tape 52 in order to fix tiles resting thereon or—if the burled plate is used as wall covering—to attach additional wall linings or the like.

Finally, FIGS. 27, 28, 29 and 30 show a further preferred embodiment of the burled plate 25 in which the burls 55 have an octagonal opening 54 at the inner circumference. The opening receives plug elements 48 whose shaft is slotted and has a cross slot 50 and a screw hole 51. In the inserted state, the end plate 49 of the plug elements 48 terminates flush with the end surface of the burls 55. The octagonal shape of the openings facilitates insertion and removal of the plug elements 48 since the resistance is low on account of the small contact surfaces between the burls and the plug elements.

As is apparent, in particular, from FIG. 27, the rectangular burled plate has at two neighboring longitudinal sides, equally long extensions 56 whose length corresponds to the mutual spacing between the burls. These extensions can be made to positively engage at their end edge one extension 56 of a neighboring burled plate, in each case. In the illustrated case, the extensions are of concave arched configuration and accommodate in these concave recesses the correspondingly convex shaped extensions of the neighboring plates. This ensures correct laying of the burled plates on floors and walls without additional aids such as laying stencils, distance gauges or the like having to be used.

As is apparent, the above-described burled plates are plates which can be inexpensively manufactured in quantity production and since they can be installed underneath the carpeting or a wall covering they may consist of a material which is imperfect with respect to color. Accordingly, the material from which they are made may be recycling material.

What is claimed is:

1. Spacer for separating a surface, such as a floor or wall, from substantially heavy articles which may be loaded on said surface, for enabling positioning of cables between said surface and said substantially heavy articles, wherein said spacer is of planar configuration and has two planar sides, said spacer having load-bearing burl projections on at least one of said two planar sides, said projections further being arranged in an array and having between them intermediate spaces for the formation of cable channels, said cable channels extending in substantially intersecting directions, and said projections being configured to bear a loading in excess of 7500 kgf/m$^2$.

2. Spacer as defined in claim 1, wherein said spacer is a composite structure which is made up of single, axially symmetrical molded members which are open (30) or closed at one side (26) and form said projections.

3. Spacer as defined in claim 2, wherein said molded members (30) are formed by hollow cylinders which are connected to one another by radial bridges (28, 32).

4. Spacer as defined in claim 2, wherein said molded members (26) are of hollow and frusto-conical configuration and have an angle of inclination of between approximately 60 degrees and 90 degrees.

5. Spacer as defined in claim 1, wherein the spacer is formed in one piece as an injection molded member, from a synthetic plastic material selected from the group consisting of PVC, polyurethane, polyamide, polypropylene, and hard rubber.

6. Spacer as defined in claim 2, wherein the spacer is arranged on the rear side of a wall or floor covering (10, 11).

7. Spacer as defined in claim 6, wherein said wall or floor covering (10, 11) is supported on said molded members (26').

8. Spacer as defined in claim 6, wherein said wall or floor covering (10, 11, 20) is provided on its upper side with a fibrous pile (10) which is anchored in a layer selected from the group consisting of latex, polyvinyl chloride, and bitumen and with a soft substrate layer (12).

9. Spacer as defined in claim 2, wherein said molded members (19) have a diameter of 8 to 25 mm, a height of 10 to 20 mm and a mean spacing of 15 to 40 mm.

10. Spacer as defined in claim 2, wherein a rigid load-distributing base plate (23) rests on the molded members (19) which project to said one side.

11. Spacer as defined in claim 8, wherein there is attached, by adhesion, to the underside of said substrate layer (12) a hard, load-distributing base plate (23) from which there protrude grid elements (43, 44) which press under the action of friction in to the cable channels (18) of an underlying base plate (25, 28, 32) for mutual fixing.

12. Spacer as defined in claim 11, wherein said grid elements (43, 44) are arranged at right angles to one another and in spaced relation to one another.

13. Spacer as defined in claim 11, wherein said base plate (23) including said grid elements (43, 44) is formed from extrusible material selected from the group consisting of PVC, polyurethane, polyamide, and hard rubber.

14. Spacer as defined in claim 11, wherein said grid elements (43, 44) of said base plate (23) are formed from metal selected from the group consisting of steel and aluminum.

15. Spacer as defined in claim 13, wherein said base plate (23) including said grid elements (43, 44) is formed from multi-ply hardboard made of wood or paper.

16. Spacer as defined in claim 13, wherein said base plate (23) has a soft elastic layer (12) such as a foamed rubber layer on the underside.

17. Spacer as defined in claim 1, wherein said spacer has screw holes (27) on or between projections.

18. Spacer as defined in claim 2, wherein said projections (30) are open at the upper end side.

19. Spacer as defined in claim 18, wherein said projections (30) have an upper end wall comprising a rectangular, or square opening.

20. Spacer as defined in claim 2, wherein said projections (30) are open at the top and are of non-circular configuration at the inside circumference and have a circular inside annular shoulder (47) at the top.

21. Spacer as defined in claim 20, wherein there are associated with said projections (30), plug elements (37, 38) which are positively insertable therein with a shaft from above and in the inserted state terminate flush with said projections.

22. Spacer as defined in claim 21, wherein said opening of said projections (45) receiving said plug element (48) is of polygonal cross-section.

23. Spacer as defined in claim 21, wherein said shaft of said plug elements (48) is slotted.

24. Spacer as defined in claim 21, wherein an upper end wall of said plug elements has a central opening (35) for receiving an attachment element.

25. Spacer as defined in claim 2, wherein said projections (30) comprise an upper end wall through which a central opening (35) extends, and in that a holding member (40) which spreads open radially and engages behind said end wall is insertable in a self-supporting manner in said opening (35).

26. Spacer as defined in claim 1, wherein said spacer is rectangular and comprises at two neighboring longitudinal sides equally long extensions (56) whose length corresponds to the mutual spacing between said projections.

27. Spacer as defined in claim 26, wherein said extensions (56) of said spacer (25) are positively engageable at their end edge with one projection (55) of a neighboring spacer, in each case.

28. Spacer as defined in claim 1, wherein said spacer has a conductive metal vapor-deposited thereon or is galvanically coated with a conductive metal selected from the group consisting of copper and nickel.

29. Spacer as defined in claim 5, wherein said injection molded member is formed from a polypropylene with a low inflammability with a static conducting soot material in a proportion of 5 to 25% by weight.

30. Floor covering with a fiber pile which is anchored in a layer selected from the group consisting of latex, polyvinyl chloride, and bitumen, and a substrate layer, characterized by a base plate provided with burls which project to one side in rows at a distance with attendant formation of cable channels, and wherein the base plate with the burls is constituted by a knitted or woven material which is coated with synthetic resin and hardened.

31. Floor covering according to claim 30, wherein the burls are stamped in a frusto-conical shape out of the knitted or woven material, and having a solid angle of convergence of an outward direction of 20°.

32. Floor covering according to claim 30, wherein the knitted or woven material has a thickness of 0.6 to 1.2 mm and is formed in a mesh having sides varying between 0.8 mm and 1.2 mm.

33. Floor covering according claim 30, wherein the burls have a diameter of 8 to 15 mm, a height of 10 to 20 mm, and central distance of 15 to 35 mm.

34. Floor covering according to claim 30, wherein the knitted or woven material includes chemical fibers selected from the group consisting of polyester and polyacryl nitrite fibers.

35. Floor covering according to claim 30, wherein the fibers of the knitted or woven material are twistedly surrounded by electrically conductive fibers selected from the group consisting of carbon fibers and metallic fibers.

36. Floor covering according to claim 30, wherein the knitted or woven material is impregnated with a hardened synthetic resin.

37. Floor covering according to claim 36, wherein the hardened synthetic resin is a condensation resin.

38. Floor covering according to claim 36, wherein the hardened synthetic resin is phenolic resin.

39. Floor covering according to claim 30, wherein the burls are filled with synthetic resin concrete and that the floor covering is provided with a weight of 4000 to 6000 g/m$^2$.

40. Floor covering according to claim 39, wherein the mesh is extensible, and that synthetic resin concrete is pressed into the extensible mesh.

41. Floor covering according to claim 30, wherein a rigid load-distributing base layer lies on the burls which project to one side.

* * * * *